United States Patent [19]

Kesselring

[11] Patent Number: 4,701,120
[45] Date of Patent: Oct. 20, 1987

[54] APPARATUS FOR FORMING ACCORDION PLEATS IN A THIN-WALLED PLASTIC CONTAINER

[75] Inventor: Wolfgang Kesselring, Goshen, Conn.

[73] Assignee: Jamieson Manufacturing Company, Inc., Torrington, Conn.

[21] Appl. No.: 816,381

[22] Filed: Jan. 6, 1986

[51] Int. Cl.[1] ............................................. B29C 53/22
[52] U.S. Cl. .................................. 425/369; 264/339; 425/387.1; 425/396; 425/397; 425/400
[58] Field of Search ............... 425/336, 396, 369, 384, 425/387.1, 397, 400, 388; 264/339, 294, 534, 295, 322

[56] References Cited

U.S. PATENT DOCUMENTS

| | | | |
|---|---|---|---|
| 1,281,462 | 10/1918 | Wills | 425/396 |
| 1,794,435 | 3/1931 | Barth | 425/396 X |
| 2,068,031 | 1/1937 | Mattinson | 425/369 X |
| 2,265,111 | 12/1941 | Brown | 425/396 X |
| 3,012,604 | 12/1961 | Zieg | 425/369 X |
| 4,038,011 | 7/1977 | Lemelson | 425/396 X |
| 4,153,665 | 5/1979 | Vecchiotti et al. | 264/295 |
| 4,170,622 | 10/1979 | Uhlig | 264/534 X |
| 4,594,162 | 6/1986 | Berger | 425/369 X |

Primary Examiner—Richard L. Chiesa
Attorney, Agent, or Firm—McCormick, Paulding & Huber

[57] ABSTRACT

Apparatus for forming accordion pleats in and about the sidewall of a thin-walled plastic container. Said apparatus comprising a forming station, a gripping and transporting means for introducing unpleated containers to the forming station and for removing the same from the forming station. Hot air means renders the containers malleable at the forming station. A plurality of circumaxially arranged forming plates move radially inwardly to engage the container sidewall and to form accordion pleats therein. Thereafter the plates are retracted radially for the introduction of the next succeeding container. A ring cam is intermittently rotated to operate the forming plates with the forming "dwell" regulated by a small cam.

10 Claims, 9 Drawing Figures

APPARATUS FOR FORMING ACCORDION PLEATS IN A THIN-WALLED PLASTIC CONTAINER

BACKGROUND OF THE INVENTION

The present invention relates to thin-walled plastic containers which are provided with axially elongated accordion pleats in and about their sidewalls whereby to provide for the radial expansion and contraction of the containers. Commercially successful apparatus for providing the accordion pleats in the sidewalls of the containers has been unavailable to the present time.

It is the general object of the present invention to provide apparatus for forming a circumaxially extending series of axially elongated accordion pleats in and about the sidewall of a generally cylindrical thin-walled plastic container, which apparatus may be operated cyclically whereby to accommodate a succession of containers in an efficient high speed production operation at economic advantage.

SUMMARY OF THE INVENTION

In accordance with the present invention and in fulfillment of the foregoing object, an apparatus is provided for forming a circumaxially extending series of axially elongated accordion pleats in and about the sidewalls of generally cylindrical thin-walled plastic containers which are closed at one end and which have reduced diameter opposite end portions with openings extending axially therethrough. The apparatus comprises a container forming station and a container gripping and transporting means for successively engaging unpleated containers at their said reduced diameter opposite end portions and for transporting the same to and from the container forming station. A means for rendering the containers malleable at least along their sidewalls when they are delivered to the forming station preferably takes the form of a heating means and, more specifically, a means for introducing hot air to the interior of the containers prior to the delivery of the same to the forming station. After the hot air introduced to the interior of the containers renders the sidewalls thereof malleable, the air is exhausted from the containers prior to their introduction to the forming station so as not to create an elevated pressure condition within the containers which might interfere with the efficient forming of the sidewalls thereof to the desired accordion pleat configuration.

At the forming station, a plurality of circumaxially arranged radially movable forming blades are disposed about a container. Each of the blades is elongated axially along and adjacent the sidewall of the container. An operating means for the blades is adapted cyclically and in unison to move the blades radially inwardly and outwardly whereby respectively to form accordion pleats in and around the sidewall of the container and to release the container at the forming station. The container gripping and transporting means serves successively to introduce and to remove pleated and unpleated containers from the forming station in axial movement of the containers and in timed relationship with the radial inward and outward movement of the forming blades.

More particularly, the forming blades are supported by carriers and slides both of which are movable radially to effect the aforesaid radial forming blade movement. Operating means in driving relationship with each carrier and slide comprises an annular cam with a follower associated with each slide. The annular cam has a generally sinusoidal track which receives the several followers associated with the slides and the cam is adapted for incremental rotation whereby to urge the followers and their associated slides, carriers and forming blades radially inwardly and outwardly as aforesaid. The annular cam is operated by gearing and an electric motor and clutch-brake unit and the dwell of the forming blades during the accordion pleat forming operating may be readily controlled by a relatively simple limit switch and cam device.

The container gripping and transporting apparatus includes means for gripping an annular outwardly projecting flange or lip which is provided at the said opposite end portion of the containers and the hot air is or may be introduced to the interior of the container by means of supply and discharge conduits extending into the axial opening at said end portion of the containers. A first operating means selectively causes the gripping and transporting apparatus to grip and release a container at its said annular flange and a second operating means selectively moves the apparatus toward and away from the forming station whereby respectively to introduce a container and to remove the same from the forming station. Preferably, each of said operating means is of the fluid cylinder type and is operated selectively as required in timed relationship with the operation of the forming blades at the forming station.

DESCRIPTION OF PREFERRED EMBODIMENT

Figure 1:
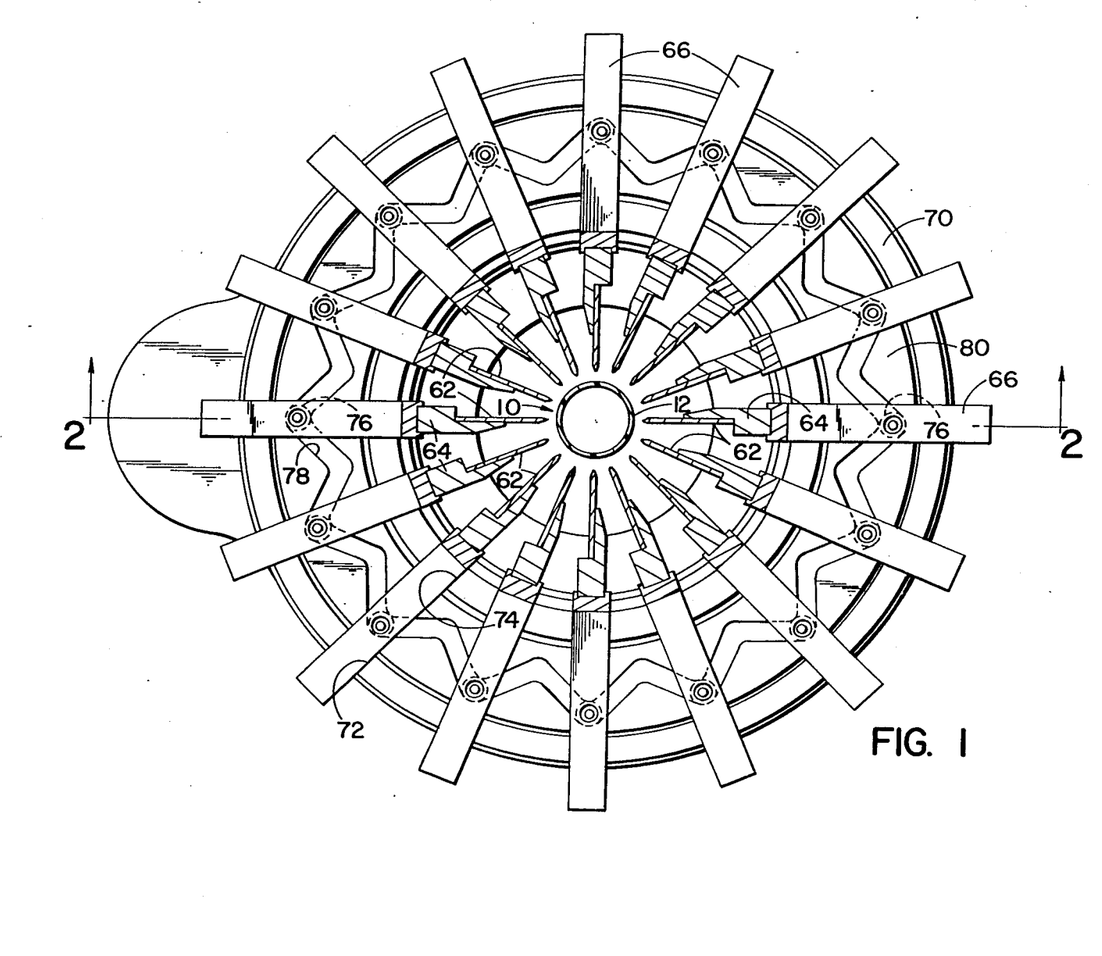
FIG. 1 is a top view of a forming station, forming blades, carriers and slides associated therewith with a gripping and transporting apparatus eliminated for clarity of illustration.
Figure 2:
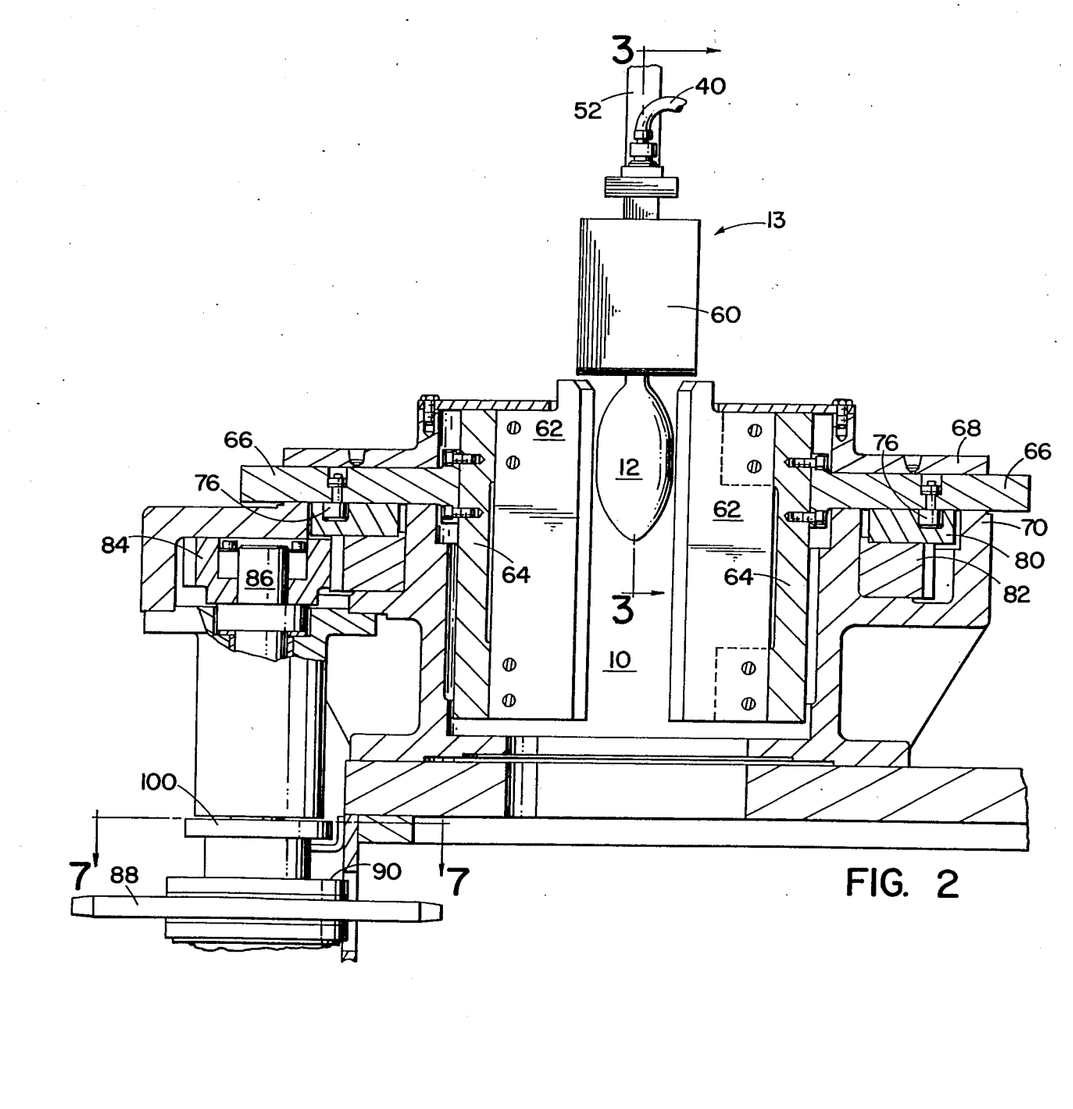
FIG. 2 is a vertical section taken generally as indicated at 2, 2 in FIG. 1 and showing the forming station, blades, carriers, slides, etc., and the gripping and transporting apparatus, the forming blades being illustrated in an open or inoperative position.

Referring particularly to FIGS. 1 and 2, it will be observed that the apparatus of the present invention includes a forming station 10. Thin-walled generally cylindrical plastic containers to be pleated are introduced in succession to the forming station 10 and, as best illustrated in FIG. 2, the containers such as a container 12 are lowered to the forming station 10 by means of a container gripping and transporting apparatus 13. After pleating of the sidewall of a container such as 12, the container is raised from the forming station by the gripping and transporting means or apparatus and a succeeding container is positioned at the forming station for pleating of its sidewall.

Figure 8:
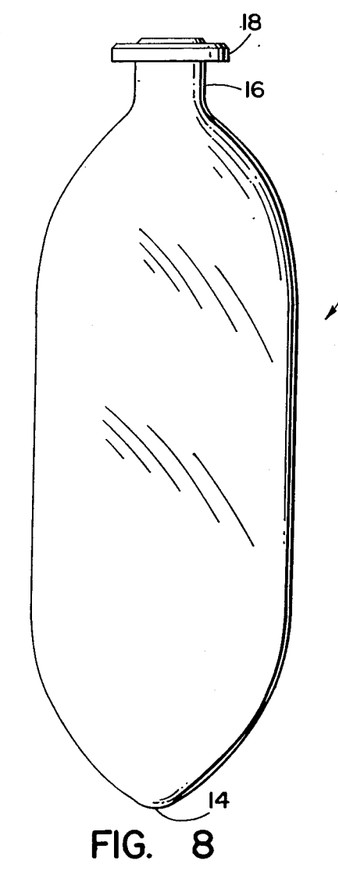
FIG. 8 is a somewhat schematic view in elevation showing a container prior to the formation of accordion pleats along its sidewall.
Figure 9:
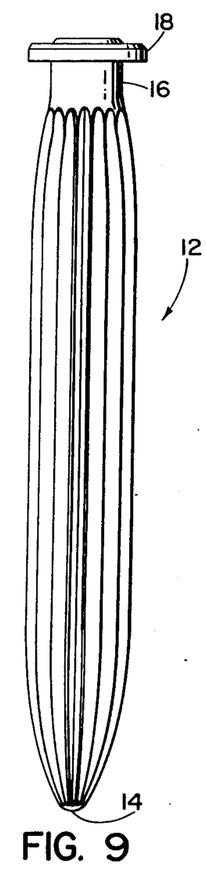
FIG. 9 is a view similar to FIG. 8 but showing the container subsequent to the formation of the accordion pleats along its sidewall.

Referring particularly to FIGS. 8 and 9, a container 12 in FIG. 8 is of a generally cylindrical thin-walled plastic construction and is closed at a lower end portion 14 with a reduced diameter opposite end portion or neck 16. A lip or outwardly projecting annular flange 18 is provided adjacent the neck 16 and an axial opening extends through the reduced diameter or neck portion in communication with the interior of the container. To provide for the ready expansion and contraction of the containers, they are pleated along their sidewalls with a circumaxially extending series of axially elongated accordion pleats being the presently preferred construction. Thus, the pleats in FIG. 9 extend substantially throughout the axial dimension of the sidewall of the container 12 and are equally spaced with the series of pleats extending circumaxially about the sidewall of the container.

Figure 3:
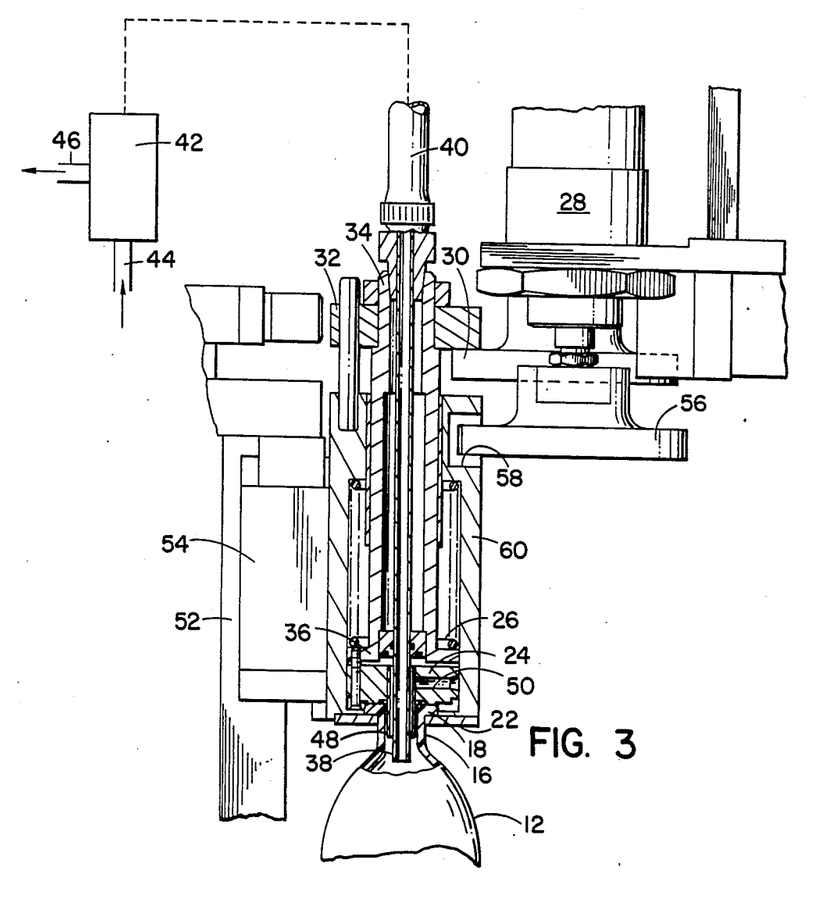
FIG. 3 is an enlarged fragmentary vertical section through the gripping and transporting apparatus illustrated in FIG. 2, taken generally as indicated 3, 3 in FIG. 2.

A container gripping and transporting means or apparatus 13 of FIG. 2 is best illustrated in vertical section in FIG. 3. The annular flange or lip 18 on container 12 is shown in axial engagement with a bottom plate 22 of the gripping and transporting apparatus 13 and an upper portion of the flange or lip 18 is axially engaged by a spring biased clamping member 24. That is, the member 24 is urged axially downwardly by a coil spring 26 and axially engages the flange or lip 18 with a lower axial surface of the lip being engaged by the plate 22 whereby to provide a clamping action on the flange or lip. The introduction of the flange or lip 18 to the position shown may be accomplished by horizontal movement of the container 12 through an opening in the gripping and transporting apparatus 13, not shown, with the clamping member 24 elevated to provide for such entry by means of an operating means comprising a fluid cylinder 28. The fluid cylinder 28 includes a cylinder rod which extends downwardly and which carries a flanged element 30 at a lower end portion which enters beneath a similar flanged element 32 at an upper end portion of the gripping and transporting means. The member 32 is fixed to an annular sleeve 34 which at a lower end portion is connected with the clamp 24 and which has a seat 36 for the spring 26. Thus, the member 30 can be raised by the fluid cylinder 28 to compress the spring 26 whereby to provide for the horizontal entry of the flange or lip 18 to the position shown. On release of the upward force excerted by the fluid cylinder 28 the spring 26 will urge the members 32, 34 and the clamp 24 downwardly to engage the flange and thus secure the container 12 in a depending or downwardly projecting position as illustrated.

In accordance with the presently preferred practice, a means is provided for rendering at least the sidewall of a container such as 12 malleable prior to the introduction of the same to the forming station 10. Further, hot air is presently preferred as a medium for rendering the sidewalls of the container malleable and may be introduced by means of a supply conduit 38 which extends downwardly within the annular member 34 and which is moved upwardly and downwardly therewith. Thus, when the member 34 is urged upwardly by the element 30 of the fluid cylinder 28 the said member is elevated well above the position shown so as to provide for the lateral or horizontal entry of the flange 18 of a container 12. Thereafter, when the fluid cylinder 28 is operated to allow the member 34 to be moved downwardly at the urging of the spring 26, the supply conduit 38 enters the axial opening in the neck 16 of the container 12 and reaches the position shown in FIG. 3. At an upper end portion of the conduit 38 a supply line 40 is provided and extends to a valve 42 having first and second lines 44, 46. The line 44 may serve as a supply line for the valve 42 with a suitable connection to a source of supply of hot air under pressure. The line 46 may serve as a discharge or exhaust line for the valve 42 and for the conduits 38 and 40. Thus, a container 12 may be heated by the introduction of hot air and the hot air may thereafter be exhausted from the interior of the container prior to the introduction of the container to the forming station. At the forming station, it is undesireable for a container to have its interior under pressure as this might interfere with the proper or efficient forming of the accordion pleats in the sidewall thereof.

An annular conduit 48 disposed about the aforementioned conduit 38 and in communication with a short lateral conduit 50 extending through the clamp member 24 provides for the outflow or discharge of hot air during the period of time when the hot air is supplied to the interior of a container 12 for heating of the same and for rendering the sidewall of the container malleable for forming. Thereafter and as indicated above, the valve 42 may be operated to close the supply line 44 and to open the discharge or exhaust line 46 whereupon the interior of a container 12 will be effectively exhausted through conduits 38, 40 and valve 42 prior to introduction of the same to the forming station 12.

In introducing a container such as 12 to the forming station 10, the entire gripping and transporting apparatus 13 is moved downwardly to a position shown in FIG. 2. Thus, a slide 52 and a saddle member 54 associated with the gripping and transporting apparatus 13 provide for the vertical movement of the same toward and away from the forming station 10 with a container 12 depending therebeneath. A portion of a fluid cylinder and operating element is illustrated at 56 wherein the operating element is introduced to a slot 58 in the housing 60 of the gripping and transporting means 13. The operating element 56 of the fluid cylinder associated therewith may be moved upwardly and downwardly as indicated to urge the apparatus 13 upwardly and downwardly along the slide 52 whereby successively to introduce containers to the forming station 10 and to withdraw the same upwardly on completion of the formation of the desired accordion pleats in the sidewall thereof.

Figure 4:
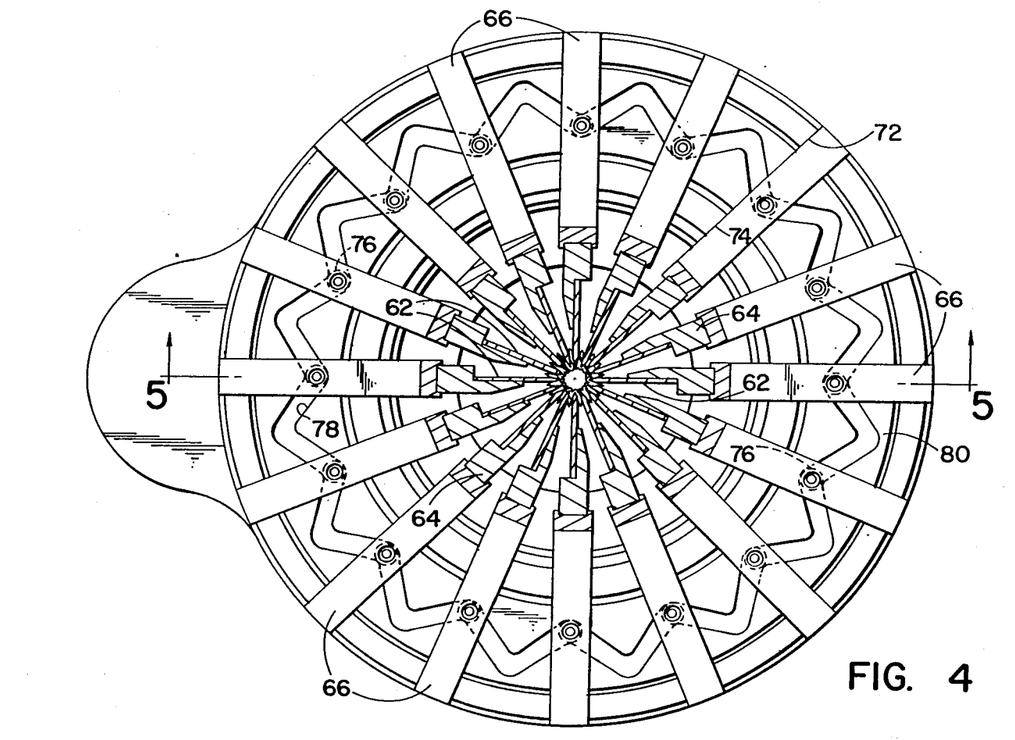
FIG. 4 is a top view similar to FIG. 1 but showing the forming blades, carriers and slides in an inner or operative position and serving to form accordion pleats on a container positioned at the forming station.

At the forming station 10 a plurality of circumaxially arranged radially movable forming blades 62, 62 are provided about a container positioned at the station. The blades are elongated axially along and adjacent the sidewall of a container so positioned and it will be apparent that they may be moved radially inwardly from the FIG. 1 to the FIG. 4 position whereby to engage a container sidewall and to form the same to the accordion pleated configuration of FIG. 9. Thus, a container 12 in FIG. 4 has been formed to the FIG. 9 configuration by the simultaneous radial inward movement of blades 62, 62. When the blades are thereafter withdrawn to the FIG. 1 and FIG. 2 position, the formed container 12 may be raised from the forming station by an appropriate upward movement of the gripping and transporting apparatus 13 and a succeeding container may then be introduced to the forming station. As will be apparent, a plurality of horizontally movable gripping and transporting means may be readily provided as in a turret arrangement for sequential operation in introducing and removing containers from the forming station.

The blades 62, 62 are supported on carriers 64, 64 best illustrated in FIG. 2 and each carrier 64 is provided with a radially inwardly and outwardly movable slide 66 which is in operative association therewith and which controls the movement thereof together with that of its corresponding blade 62. The slide 66, 66 may be secured in position between upper and lower members 68, 70 in FIG. 2 and may be slideable in suitable notches 72, 74 in the member 70, FIG. 4.

Figure 5:
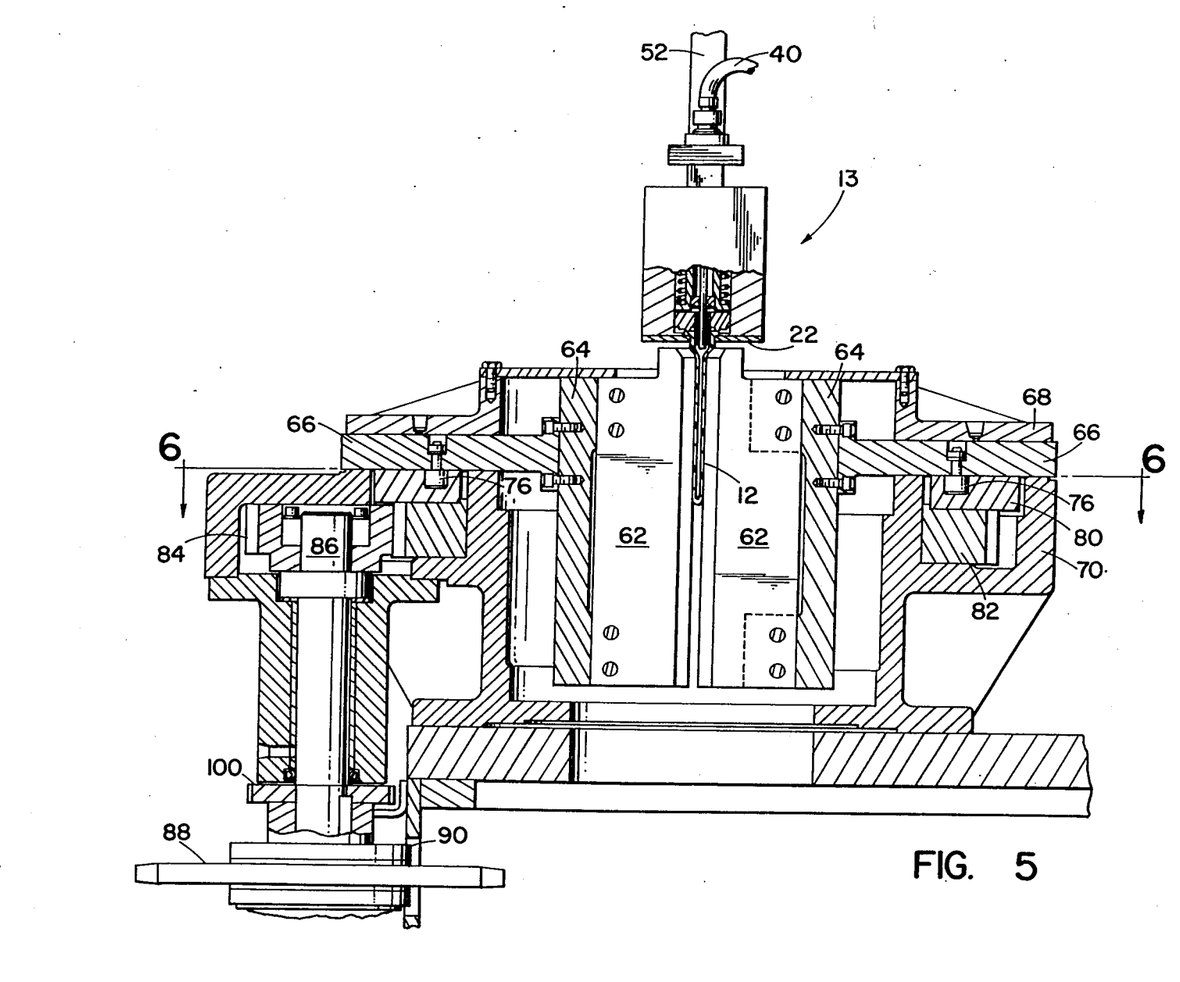
FIG. 5 is a vertical section taken generally as indicated at 5, 5 in FIG. 4 and illustrating the blades, carriers, etc. in the inner or operative position.
Figure 6:
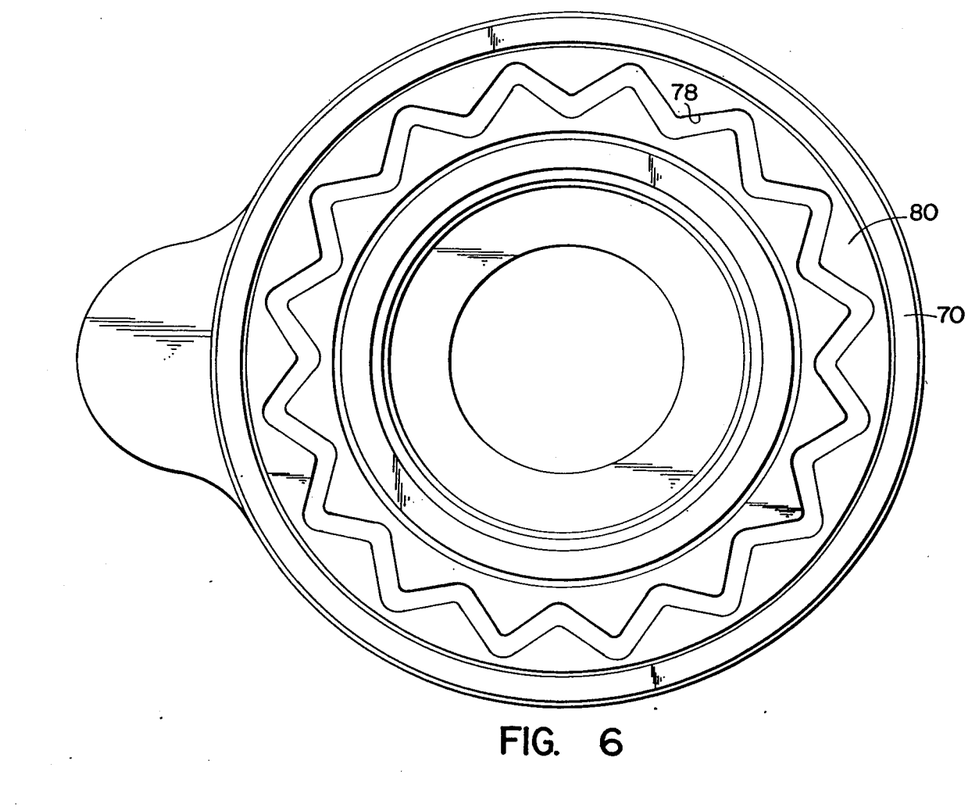
FIG. 6 is a horizontal sectional view taken generally as indicated at 6, 6 in FIG. 5 with blades, carriers, etc., deleted for clarity of illustration and showing an annular cam and its track.

Each slide 66 carries a follower 76 which depends therefrom and which is entered in a track 78 in an annular cam 80. The cam 80 has an associated ring gear 82, FIGS. 2 and 5, and a spur gear 84 which is operatively associated with and in driving relationship with the ring gear 82. Thus, rotation of the gear 84 will in turn rotate the ring gear 82 and the annular cam 80 with a shaft 86 mounted in driving relationship with the gear 84. The shaft 86 is driven from an operating means partially indicated at 88 and which may include an electric motor and clutch-brake unit, not shown, together with the usual speed reducer. A safety clutch may also be provided at 90.

As will be apparent from the foregoing, the clutch-brake mechanism may be operated to provide for incremental rotation of the shaft 86, gears 82, 84 and the cam 80. Thus, the slides 66, 66 under the control of the followers 76, 76 will be urged inwardly and outwardly in accordance with the generally sinusoidal configuration of the cam track 78. With the elements in the relative positions shown in FIG. 1 and with a container 12 introduced to the forming station 10, the incremental rotation of the cam 78 will of course result in the movement of the elements to the FIG. 4 positon whereat the forming blades 62, 62 engage and form the desired accordion pleats along the sidewall of the container. Thereafter, the next successive incremental rotation of the driving elements including the aforesaid gears and the annular cam will result in a return movement of the slides, carries and blades to the FIG. 1 position.

Figure 7:
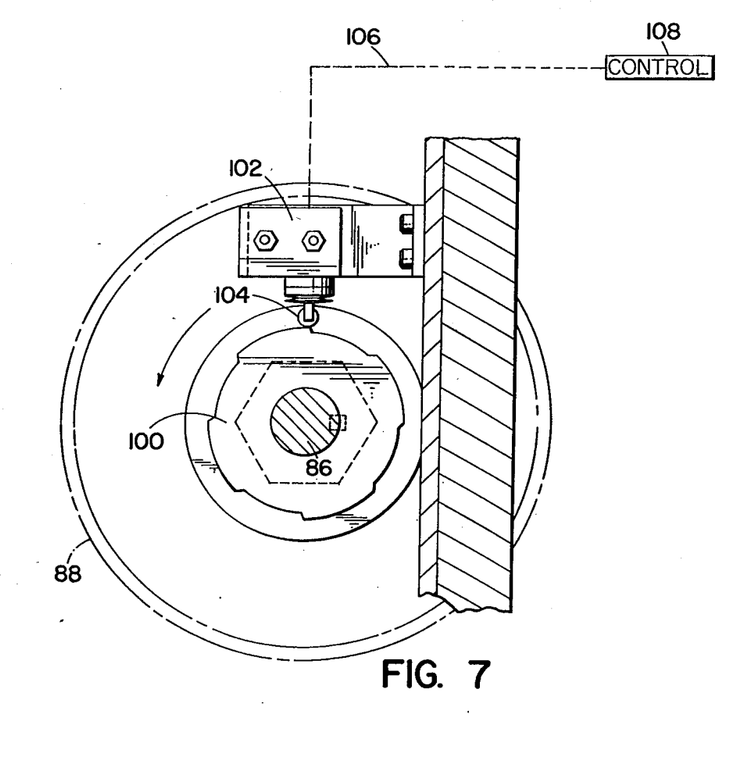
FIG. 7 is a fragmentary horizontal sectional view taken generally as indicated at 7, 7 in FIG. 2 and showing a small timing cam and limit switch operable to establish the dwell time of the forming blades in their inner or operative position.

The length of time required for effective forming of the accordion pleats in the sidewall of the containers may vary but a presently preferred thin-walled plastic material is found to be effectively formed with the introduction of air at a temperature of approximately 250° F. and a two-tenths (0.2) of a second "dwell" in the inner or operative position of the blades 62, 62. Referring to FIG. 7 it will be observed that a small control cam may be provided as at 100 to establish and to maintain a desired "dwell" time. Thus, a signal from a switch 102 actuated by a cam follower 104 transmitted through line 106 to a machine control 108 can be employed to determine the desired dwell of the blades in the inner position. Radially inward movement of the blades to the FIG. 4 position may of course be commenced on receipt of an appropriate signal from a machine control indicating that all machine elements are in a state of readiness.

From the foregoing, it will be apparent that a simple and yet highly effective apparatus has been provided for the successive accommodation of a plurality of thin-walled plastic containers with the sidewalls thereof in an unpleated condition, the containers being successively pleated along their sidewalls with the sidewalls first rendered malleable by the introduction of hot air, and the containers being handled in an efficient manner with the gripping and transporting apparatus operable in timed relationship with the forming blades and their support and operating elements.

I claim:

1. Apparatus for forming a circumaxially extending series of axially elongated accordion pleats in and about the sidewall of a generally cylindrical thin-walled plastic container which is closed at one end and which has a reduced diameter opposite end portion with an opening extending axially therethrough, each said container also having a radially outwardly projecting annular flange at its said reduced diameter opposite end portion, said apparatus comprising a container forming station, a container gripping and transporting means having an inwardly extending plate on its bottom for successively engaging unpleated containers about the annular flanges on their said reduced diameter opposite end portions and for transporting the same to and from the container forming station, the remaining portions of each container projecting from the gripping and transporting apparatus for introduction to and removal from said forming station, and said container gripping and transporting apparatus also including air supply and discharge conduits which enter said axially extending opening in said opposite end portion of a container, and a pressurized hot air supply source being provided for connection with said air supply line for the introduction of hot air to the interior of the containers whereby to render the containers malleable at least along their sidewalls when they are delivered to the forming station, a plurality of circumaxially arranged radially movable forming blades disposed about a container introduced to the forming station, each of said blades being elongated axially along and adjacent the sidewall of a container at the forming station, and an operating means for said forming blades adapted to cyclically and in unison move the blades radially inwardly and outwardly respectively to form accordion pleats in and around the sidewall and to release a container at the forming station, said container gripping and transporting means serving successively to introduce and to remove unpleated and pleated containers from said forming station in axial movement of the containers and in timed relationship with the radial inward and outward movement of said forming blades.

2. Apparatus for forming a circumaxially extending series of axially elongated accordion pleats in and about the sidewall of a generally cylindrical thin-walled plastic container as set forth in claim 1 wherein each forming blade has a supporting carrier and slide both of which are movable radially to effect the aforesaid radial forming blade movement, and wherein said operating means is in driving relationship with each said carrier and slide to effect cyclical radial movement of the latter and their respective forming blades in unison.

3. Apparatus for forming a circumaxially extending series of axially elongated accordion pleats in and about the sidewall of a generally cylindrical thin-walled plastic container as set forth in claim 1 wherein said operating means comprises a plurality of cam followers associated respectively with said carriers and slides and an annular cam operatively associated with said followers and adapted for controlled incremental rotation whereby cyclically to move the carriers, slides, and blades radially inwardly and outwardly as aforesaid.

4. Apparatus for forming a circumaxially extending series of axially elongated accordion pleats in and about the sidewall of a generally cylindrical thin-walled plastic container as set forth in claim 3 wherein said annular cam has at least one follower engaging cam surface which faces radially inwardly and which is displaced radially in circumaxial progression to provide the aforesaid cyclical carrier, slide and blade movement.

5. Apparatus for forming a circumaxially extending series of axially elongated accordion pleats in and about the sidewall of a generally cylindrical thin-walled plastic container as set forth in claim 4 wherein said annular cam has a generally sinusoidal annular cam track which receives said cam followers and which cyclically urges the same radially inwardly and outwardly as aforesaid.

6. Apparatus for forming a circumaxially extending series of axially elongated accordion pleats in and about the sidewall of a generally cylindrical thin-walled plastic container as set forth in claim 5 wherein said annular cam is provided with a drive means comprising an electric motor and clutch-brake unit for effecting incremental rotation of the cam as aforesaid.

7. Apparatus for forming a circumaxially extending series of axially elongated accordion pleats in and about the sidewall of a generally cylindrical thin-walled plastic container as set forth in claim 1 wherein valve means is provided for controlling the selective introduction of hot air and the exhaust of the interior of the containers, the exhaust of the interior of each container serving to assure a relatively low pressure condition therein during forming of the sidewall thereof.

8. Apparatus for forming a circumaxially extending series of axially elongated accordion pleats in and about the sidewall of a generally cylindrical thin-walled plastic container as set forth in claim 1 wherein said container gripping and transporting means includes a first operating means for selectively causing the apparatus to grip and release a container at its said annular flange.

9. Apparatus for forming a circumaxially extending series of axially elongated accordion pleats in and about the sidewall of a generally cylindrical thin-walled plastic container as set forth in claim 8 wherein said container gripping and transporting apparatus includes a second operating means for selectively moving said apparatus toward and away from said forming station whereby respectively to introduce a container to and remove the same from the forming station.

10. Apparatus for forming a circumaxially extending series of axially elongated accordion pleats in and about the sidewall of a generally cylindrical thin-walled plastic container as set forth in claim 9 wherein each of said operating means is of the fluid cylinder type, and wherein said second operating means is adapted to move a container projecting therefrom axially toward and away from the forming station.

* * * * *